UNITED STATES PATENT OFFICE.

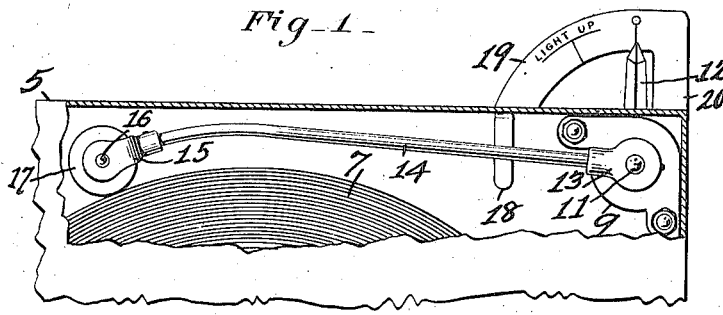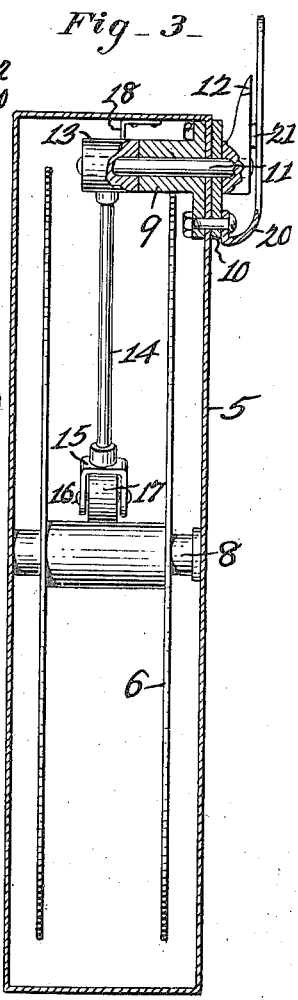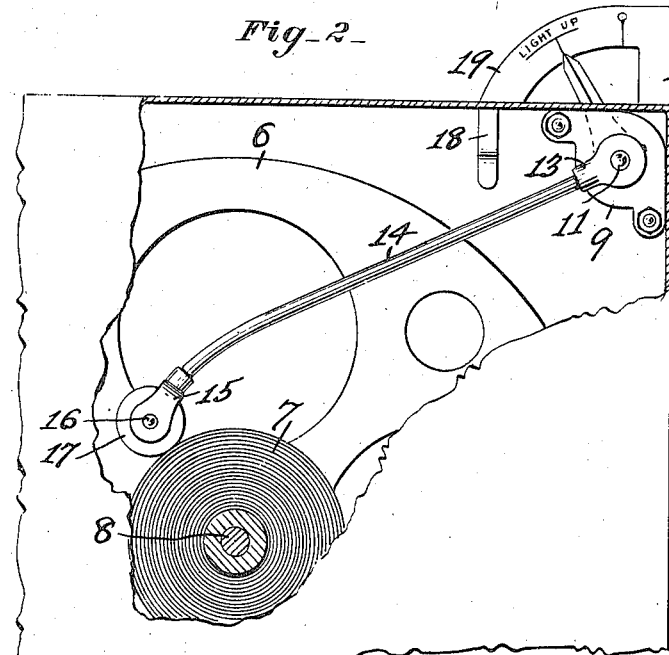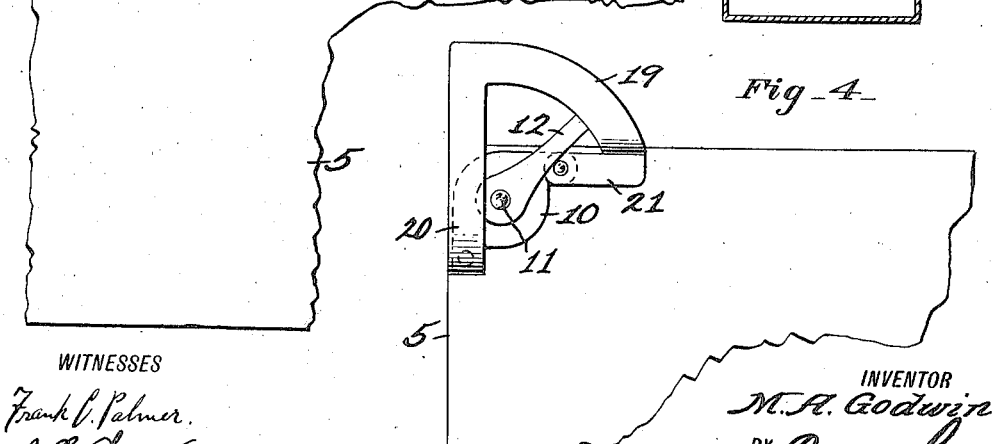
M. A. GODWIN.
FILM INDICATOR.
APPLICATION FILED DEC. 4, 1916.
1,233,868. Patented July 17, 1917.

MERRIT ALLEN GODWIN, OF BRIDGEWATER, MASSACHUSETTS.

FILM-INDICATOR.

1,233,868.

Specification of Letters Patent.

Patented July 17, 1917.

Application filed December 4, 1916. Serial No. 135,085.

*To all whom it may concern:*

Be it known that I, MERRIT ALLEN GODWIN, a citizen of the United States, and a resident of Bridgewater, in the county of Plymouth and State of Massachusetts, have invented certain new and useful Improvements in Film-Indicators, of which the following is a specification.

My invention relates to kinetoscopic projectors, with especial reference to where two projectors are employed in a booth and alternately operable, continuous projection by the two projectors requiring that the lamp in the inoperative projector must be energized a few moments before the completion of projection of a reel in the operating projector in order that the arc between the carbons shall be white and steady when the inoperative projector is started.

It is now the practice to open the magazine door to determine the time to energize the lamp in the other projector, and it was in order to overcome this objectionable and far from reliable necessity that my invention was conceived.

My invention is fully described in the following specification, of which the accompanying drawings form a part, in which like characters refer to like parts in each of the views, and in which:—

Figure 1 is a fragmentary sectional view of a film magazine with contained film reel, provided with my invention, in full reel position, approximately;

Fig. 2 is a similar view with the reel nearly in unwound position, and with my device indicating such condition;

Fig. 3 is a transverse section through the magazine; and

Fig. 4 is an exterior view of the magazine with my invention in position thereon.

Referring to the drawings, 5 represents a magazine having a reel 6 therein supporting a roll 7 of film and rotatable on the shaft 8, the gradually decreasing radius of the said roll in an operating machine being the controlling factor in indicating, by means of my device, the amount of film remaining to be projected in the operating projector in order to allow sufficient time for the clearing and steadying of the light in the inoperative projector before beginning projection of the film therein.

My device consists of inner and outer blocks 9 and 10 secured to the magazine in any desired manner and bored for a stub shaft 11 having an indicating finger 12 at its outer end and a block 13 at its inner end, both of which are immovably, though preferably detachably, secured on said shaft, and the bearing for said shaft so formed prevents the passage of light therethrough.

Secured in any desired manner to the block 13 is a rod 14 carrying a bifurcated block 15 at its outer end in turn carrying a spindle 16 for a roller 17 normally bearing upon the film roll, though adapted to be held in raised position, away from the film roll, as in reel substitution, by means of a clip or latch 18 of any desired form.

Secured to the outer block 10 is a sector 19 held in place by two arms 20 and 21 in such manner as to rest immediately adjacent the path of movement of the indicating finger 12, and said sector having a mark thereon indicating, when the finger 12 has reached it, that the time for energizing the lamp in the other projector has been reached, but said sector may have marks thereon for other indications if desired, and the finger 12 and block 13 may be held on the shaft 11 by set-screws whereby each will be adjustable with respect to said shaft.

My device is very simple in construction and in installation though entirely practical and of great value to projector operators and, while I have shown and described one embodiment thereof, I reserve the right to make structural alterations which do not depart from the spirit of the invention nor come outside the scope of the appended claim.

Having fully described my invention, what I claim as new, and desire to secure by Letters Patent, is:—

The combination with a kinetoscopic magazine, a reel therein embodying side plates, a film wound on the reel and lying between the said plates, a member pivoted in the magazine at a point above the reel and adapted to move into and out of the space between the side plates, an indicator connected with the member, and a catch mounted in the magazine and engageable with the member for holding the latter at a point above the side plates of the reel, whereby the latter can be removed without the member interfering, and whereby the member is held raised while the reel is removed.

MERRIT ALLEN GODWIN.